US011248011B2

(12) United States Patent
Hong et al.

(10) Patent No.: US 11,248,011 B2
(45) Date of Patent: Feb. 15, 2022

(54) PHOSPHORUS-BASED RELEASING AGENT, OPTICAL POLYMERIZABLE COMPOSITION COMPRISING SAME AND PREPARATION THEREOF

(71) Applicant: SKC CO., LTD., Gyeonggi-do (KR)

(72) Inventors: Seung Mo Hong, Incheon (KR); Jongmin Shim, Gyeonggi-do (KR); Jung Hwan Myung, Gyeonggi-do (KR); Junghwan Shin, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 308 days.

(21) Appl. No.: 16/283,185

(22) Filed: Feb. 22, 2019

(65) Prior Publication Data

US 2019/0263846 A1    Aug. 29, 2019

(30) Foreign Application Priority Data

Feb. 23, 2018  (KR) .................. 10-2018-0021988

(51) Int. Cl.
| | |
|---|---|
| *C07F 9/09* | (2006.01) |
| *B29C 33/60* | (2006.01) |
| *B29C 39/02* | (2006.01) |
| *B29D 11/00* | (2006.01) |
| *C08G 18/38* | (2006.01) |
| *C08K 5/521* | (2006.01) |
| *C07F 9/11* | (2006.01) |
| *C08G 18/76* | (2006.01) |
| *G02B 1/04* | (2006.01) |
| *B29K 75/00* | (2006.01) |
| *C08K 5/05* | (2006.01) |

(52) U.S. Cl.
CPC .............. *C07F 9/091* (2013.01); *B29C 33/60* (2013.01); *B29C 39/02* (2013.01); *B29D 11/00192* (2013.01); *C07F 9/11* (2013.01); *C08G 18/3876* (2013.01); *C08G 18/7642* (2013.01); *C08K 5/521* (2013.01); *G02B 1/041* (2013.01); *B29K 2075/00* (2013.01); *C08G 2125/00* (2013.01); *C08K 5/05* (2013.01)

(58) Field of Classification Search
CPC . C07F 9/091; C07F 9/11; B29C 33/60; B29C 39/02; B29D 11/00192; C08G 18/3876; C08G 18/7642; C08K 5/521; G02B 1/041
See application file for complete search history.

(56) References Cited

U.S. PATENT DOCUMENTS

| | | | | |
|---|---|---|---|---|
| 4,257,995 A | * | 3/1981 | McLaughlin | ........... C08L 97/02 |
| | | | | 264/122 |
| 5,962,561 A | * | 10/1999 | Turshani | ................. B29C 33/60 |
| | | | | 524/140 |
| 9,130,239 B2 | | 9/2015 | Wagner | |

FOREIGN PATENT DOCUMENTS

| | | |
|---|---|---|
| EP | 0912632 | 2/2005 |
| EP | 1666559 | 6/2006 |
| EP | 2805949 | 8/2016 |
| EP | 1988110 | 1/2017 |
| EP | 3135703 | 3/2017 |
| JP | 2000-191673 | 7/2000 |
| JP | 2008-255221 | 10/2008 |
| JP | 6009722 | 9/2016 |
| KR | 10-1788168 | 10/2017 |
| KR | 10-1802480 | 12/2017 |
| WO | 2004/069908 | 8/2004 |

OTHER PUBLICATIONS

Extended Search Report Issued by European Patent office dated Jul. 23, 2019.
Office Action issued by the Korean Intellectual Property Office dated Jun. 18, 2018.

* cited by examiner

*Primary Examiner* — Mathieu D Vargot
(74) *Attorney, Agent, or Firm* — IP & T Group LLP

(57) ABSTRACT

Embodiments relate to a polymerizable composition comprising a phosphorus-based mold releasing agent for an optical use whose preparation process is improved, and a process for preparing the phosphorus-based mold releasing agent. The phosphorus-based mold releasing agents can be prepared more easily and conveniently by using phosphorous pentoxide, which can easily react with a monoalcohol and/or water at room temperature in the absence of a catalyst or a solvent. In addition, byproducts are not generated during the reaction. Thus, when a lens is produced by using the mold release agent obtained therefrom, it is possible to prevent a defective appearance of the lens that may be caused by byproducts, thereby further enhancing the appearance properties thereof. Further, since separate steps for removing byproducts, specifically, such steps as washing and filtration, are not required, wastewater is not generated. Thus, it is not only environmentally friendly, but the production cost can also be reduced as the process is simple.

20 Claims, No Drawings

PHOSPHORUS-BASED RELEASING AGENT, OPTICAL POLYMERIZABLE COMPOSITION COMPRISING SAME AND PREPARATION THEREOF

The present application claims priority of Korean patent application number 10-2018-0021988 filed on Feb. 23, 2018, which is incorporated herein by reference in its entirety.

TECHNICAL FIELD

Embodiments relate to a polymerizable composition comprising a phosphorus-based mold releasing agent for an optical use whose preparation process is improved, and a process for preparing the phosphorus-based mold releasing agent.

BACKGROUND ART OF THE INVENTION

Since plastics optical materials are lightweight, hardly breakable, and excellent in dyeability as compared with optical materials made of inorganic materials such as glass, plastic materials of various resins are widely used as optical materials for eyeglass lenses, camera lenses, and the like.

Polythiourethane-based compounds are widely used as optical materials by virtue of their excellent optical characteristics and mechanical properties. In general, a polythiourethane-based compound is prepared by casting polymerization in which a polymerizable composition is injected into a mold and thermally cured. Upon the polymerization, the resin obtained by curing the polymerizable composition is to be released from the mold. In such event, since the cured resin is in close contact with the mold and is not readily released, a mold release agent must be added to have the resin released from the mold.

The most widely used mold release agent in recent years is a phosphate ester-based compound. However, the phosphate ester-based compounds used in the prior art have a disadvantage in that their preparation process is complicated and difficult to control. Specifically, a phosphate ester-based compound is prepared by reacting a phosphoryl halide such as $POCl_3$ and $POBr_3$ with a monoalcohol in a solvent in the presence of an amine catalyst. At the time of the reaction, such byproducts as a gas, e.g., HCl, HBr, and the like, and/or a large amount of a salt are generated, which requires a separate step for removing them. In addition, the byproducts are not only difficult to be removed by 100%, but also cause a poor appearance of a lens (Japanese Laid-open Patent Publication No. 2000-191673, Japanese Patent No. 6009722, U.S. Pat. No. 9,130,239).

PRIOR ART DOCUMENT

Patent Document (Patent document 1) Japanese Laid-open Patent Publication No. 2000-191673
(Patent Document 2) Japanese Patent No. 6009722
(Patent Document 2) U.S. Pat. No. 9,130,239

DISCLOSURE OF THE INVENTION

Technical Problem to be Solved

Accordingly, an embodiment aims to provide a process by which a phosphate ester compound can be obtained through a simpler method without byproducts. Further, an embodiment is to provide a polymerizable composition comprising the phosphate ester compound, so that a plastic lens having enhanced optical characteristics and appearance characteristics is provided.

Solution to the Problem

An embodiment provides a polymerizable composition for an optical use, which comprises a thiol compound, an isocyanate compound, and a phosphorus-based mold releasing agent, wherein the phosphorus-based mold releasing agent comprises a first phosphorus-based compound having one hydroxyl group and a second phosphorus-based compound having two hydroxy groups.

An embodiment provides a process for preparing a phosphorus-based mold releasing agent, which comprises reacting a compound represented by the following Formula 3 with water, an alcohol, or a mixture thereof to prepare a compound represented by the following Formula 1, a compound represented by the following Formula 2, or a mixture thereof:

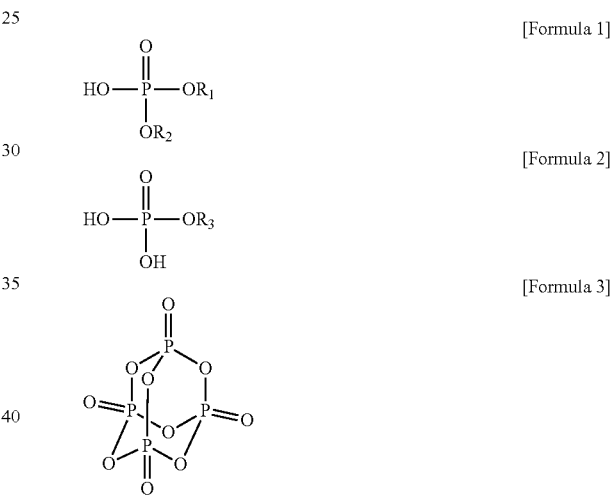

In the above Formulae, $R_1$ to $R_3$ are each independently $C_{1-30}$ alkyl, $C_{6-30}$ aryl, $C_{7-30}$ aralkyl, $C_{7-30}$ alkylaryl, or $C_{8-30}$ alkylaralkyl.

An embodiment provides a polythiourethane-based plastic lens produced by using the phosphorus-based mold releasing agentobtained by the above preparation process.

An embodiment provides a phosphorus-based mold releasing agent, which comprises a first phosphorus-based compound having one hydroxyl group and a second phosphorus-based compound having two hydroxy groups, wherein the first phosphorus-based compound is represented by the above Formula 1, the second phosphorus-based compound is represented by the above Formula 2, and the molar ratio of the first phosphorus-based compound to the second phosphorus-based compound is 0.5:1 to 1:1.

Advantageous Effects of the Invention

The phosphorus-based mold releasing agents according to the embodiments can be prepared more easily and conveniently by using phosphorous pentoxide, which can easily react with a monoalcohol and/or water at room temperature in the absence of a catalyst or a solvent. In addition, byproducts are not generated during the reaction. Thus, when a lens is produced by using the mold release agent obtained therefrom, it is possible to prevent a defective appearance of the lens that may be caused by byproducts, thereby further enhancing the appearance properties thereof. Further, since separate steps for removing byproducts, specifically, such steps as washing and filtration, are not required, wastewater is not generated. Thus, it is not only environmentally friendly, but the production cost can also be reduced as the process is simple.

DETAILED DESCRIPTION FOR CARRYING OUT THE INVENTION

Hereinafter, the present invention will be described in detail with reference to the embodiments. The embodiments are not limited to those described below. Rather, they may be modified into various forms as long as the gist of the invention is not altered.

In this specification, when a part is referred to as "comprising" an element, it is to be understood that the part may comprise other elements as well.

In addition, all numbers and expression related to the quantities of components, reaction conditions, and the like used herein are to be understood as being modified by the term "about," unless otherwise indicated.

An embodiment provides a polymerizable composition for an optical use, which comprises a thiol compound, an isocyanate compound, and a phosphorus-based mold releasing agent, wherein the phosphorus-based mold releasing agent comprises a first phosphorus-based compound having one hydroxyl group and a second phosphorus-based compound having two hydroxy groups.

Phosphorus-Based Mold Releasing Agent

As described above, the phosphorus-based mold releasing agent may comprise a first phosphorus-based compound having one hydroxyl group, a second phosphorus-based compound having two hydroxy groups, or a mixture thereof.

The first phosphorus-based compound may be a compound represented by the following Formula 1, and the second phosphorus-based compound may be a compound represented by the following Formula 2:

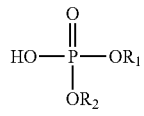
[Formula 1]

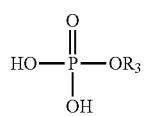
[Formula 2]

In the above Formulae, $R_1$ to $R_3$ are each independently $C_{1-30}$ alkyl, $C_{1-30}$ aryl, $C_{7-30}$ aralkyl, $C_{7-10}$ alkylaryl, or $C_{8-30}$ alkylaralkyl.

In such event, at least one of the hydrogens in the unsubstituted functional groups of $C_{1-30}$ alkyl, $C_{6-30}$ aryl, $C_{7-30}$ aralkyl, $C_{7-30}$ alkylaryl, and $C_{8-30}$ alkylaralkyl may be unsubstituted or substituted with a functional group of $C_{1-30}$ alkyl, $C_{6-30}$ aryl, $C_{7-30}$ aralkyl, $C_{7-30}$ alkylaryl, or $C_{8-30}$ alkylaralkyl.

That is, $R_1$ to $R_3$ may each independently be $C_{1-30}$ alkyl unsubstituted or substituted with the functional group as described above, $C_{6-30}$ aryl unsubstituted or substituted with the functional group as described above, $C_{7-30}$ aralkyl unsubstituted or substituted with the functional group as described above, $C_{7-30}$ alkylaryl unsubstituted or substituted with the functional group as described above, or $C_{7-30}$ alkylaralkyl unsubstituted or substituted with the functional group as described above.

More specifically, at least one of $R_1$ to $R_3$ may be a compound represented by the following Formula 5:

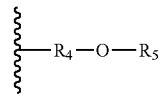
[Formula 5]

In the above Formula, $R_4$ is $C_{6-30}$ arylene, $C_{7-30}$ aralkylene, $C_{7-30}$ alkylarylene, or $C_{8-30}$ alkylaralkylene, and $R_5$ is $C_{6-30}$ aryl, $C_{7-30}$ aralkyl, $C_{7-30}$ alkylaryl, or $C_{8-30}$ alkylaralkyl.

In such event, at least one of the hydrogens in the unsubstituted functional groups of $C_{6-30}$ arylene, $C_{7-30}$ aralkylene, $C_{7-30}$ alkylarylene, $C_{8-30}$ alkylaralkylene, $C_{6-30}$ aryl, $C_{7-30}$ aralkyl, $C_{7-30}$ alkylaryl, and $C_{8-30}$ alkylaralkyl may be unsubstituted or substituted with a functional group of $C_{1-30}$ alkyl, $C_{6-30}$ aryl, $C_{7-30}$ aralkyl, $C_{7-30}$ alkylaryl, or $C_{8-30}$ alkylaralkyl.

That is, $R_4$ may be $C_{6-30}$ arylene unsubstituted or substituted with the functional group as described above, $C_{7-30}$ aralkylene unsubstituted or substituted with the functional group as described above, $C_{7-30}$ alkylarylene unsubstituted or substituted with the functional group as described above, or $C_{8-30}$ alkylaralkylene unsubstituted or substituted with the functional group as described above. $R_5$ may be $C_{6-30}$ aryl unsubstituted or substituted with the functional group as described above, $C_{7-30}$ aralkyl unsubstituted or substituted with the functional group as described above, $C_{7-30}$ alkylaryl unsubstituted or substituted with the functional group as described above, or $C_{8-30}$ alkylaralkyl unsubstituted or substituted with the functional group as described above.

More specifically, $R_1$ to $R_3$ may each independently be selected from the group consisting of an octyl group, a butoxyethyl group, a 2-butoxyethyl group, a butoxy group, a 1-butoxy group, a dodecyl group, a tri(propylene glycol)n butylethyl group (wherein n is an integer of 1 to 10), a 2-(2-(2-methoxyethoxy)ethoxy)ethyl group, a methyl group, an ethyl group, a 1-propyl group, an isopropyl group, a 1-butyl group, a 2-butyl group, an isobutyl group, a tert-butyl group, a 1-pentyl group, an isopentyl group, a 2-pentyl group, a 3-pentyl group, a 2-methyl-1-butyl group, a 3-methyl-2-butyl group, a tert-pentyl group, a 1-hexyl group, a 2-methyl-1-pentyl group, a 4-methyl-2-pentyl group, a 2-ethy-1-butyl group, a cyclopentyl group, a methylcyclopentyl group, a cyclohexyl group, a methylcyclohexyl, a 1-heptyl group, a 2-heptyl group, a 3-heptyl group, a methylcyclopentylmethyl group, an ethylcyclopentyl group, a cyclopentylethyl group, a cyclohexylmethyl group, a phenyl group, a naphthyl group, an anthracenyl group, a phenanthrenyl group, a benzoanthracenyl group, a benzophenanthrenyl group, a naphthacenyl group, a pyrenyl group, a dibenzoanthracenyl group, a pentacenyl group, a picenyl group, a benzopyranyl group, a tolyl group (a methylphenyl group), a dimethylphenyl group, a trimethylphenyl group, an ethylphenyl group, a propylphenyl group, a butylphenyl group, a pentylphenyl group, a cyclohexylphenyl group, a trimethylphenyl group, a methylnaphthyl group, a methylphenanthryl group, an ethylphenanthryl group, a propylphenanthryl group, a benzyl group, a phenethyl group, a 1-phenylpropyl group, a naphthylmethyl group, a naphthylethyl group, a methylbenzyl group, a dimethylbenzyl group, a trimethylbenzyl group, a butylbenzyl group, and a dibutylbenzyl group.

The compound represented by the above Formula 1 may be dioctyl hydrogen phosphate, bis(2-butoxyethyl) hydrogen phosphate, 1-(1-(1-butoxypropan-2-yloxy)propan-2-yloxy)propan-2-yl dodecyl hydrogen phosphate, bis(2-(2-(2-(2-methoxyethoxy)ethoxy)ethyl) hydrogen phosphate, di(1-methoxy-2-propyl) phosphate, di(1-ethoxy-2-propyl) phosphate, di(1-buthoxy-2-propyl) phosphate, di(2-buthoxy-3-butyl) phosphate, di(1-decyloxy-2-propyl) phosphate, di(1-cyclohexyloxy-2-propyl) phosphate, di(1-aryloxy-2-propyl) phosphate, di(1-(3,7,11,15-tetramethyl-2-hexadecyloxy)-2-propyl) phosphate, di(1-phenoxy-2-propyl) phosphate, di(1-o-methylphenoxy-2-propyl) phosphate, di(1-p-nonylphenoxy-2-propyl) phosphate, di(1-(p-chlorophenoxy-2-propyl) phosphate, di(1-(p-methoxyphenoxy-2-propyl) phosphate, di(1-benzyloxy-2-propyl) phosphate, di(1-(undecyloxy benzyloxy)-2-propyl) phosphate, di(1-(1-buthoxy-2-propoxy)-2-propyl) phosphate, di(tri(1,2-propylene glycol monobutyl ether)) phosphate, di(tetra(1,2-propylene glycol monobutyl ether)) phosphate, or di(penta(1,2-propylene glycol monobutyl ether).

Further, the compound represented by the above Formula 2 may be octyl dihydrogen phosphate, 2-butoxyethyl dihydrogen phosphate, dodecyl dihydrogen phosphate, 2-(2-(2-methoxyethoxy)ethoxy)ethyl dihydrogen phosphate, mono(1-methoxy-2-propyl) phosphate, mono(1-ethoxy-2-propyl) phosphate, mono(1-buthoxy-2-propyl) phosphate, mono(2-buthoxy-3-butyl) phosphate, mono(1-decyloxy-2-propyl) phosphate, mono(1-cyclohexyloxy-2-propyl) phosphate, mono(1-arlyoxy-2-propyl) phosphate, mono(1-(3,7,11,15-tetramethyl-2-hexadecyloxy)-2-propyl) phosphate, mono(1-phenoxy-2-propyl) phosphate, mono(1-o-methylphenoxy-2-propyl) phosphate, mono(1-p-nonylphenoxy-2-propyl) phosphate, mono(1-(p-chlorophenoxy-2-propyl) phosphate, mono(1-(p-methoxyphenoxy-2-propyl) phosphate, mono(1-benzyloxy-2-propyl) phosphate, mono(1-(undecyloxy benzyloxy)-2-propyl) phosphate, mono(1-(1-buthoxy-2-propoxy)-2-propyl) phosphate, mono(tri(1,2-propylene glycol monobutyl ether)) phosphate, mono(tetra(1,2-propylene glycol monobutyl ether)) phosphate, or mono(penta(1,2-propylene glycol monobutyl ether)) phosphate.

In such event, the phosphorus-based mold releasing agent may comprise the compound represented by the above Formula 1 and the compound represented by the above Formula 2 in a molar ratio of 0.1:1 to 1:1 or 0.5:1 to 1:1. Further, the phosphorus-based mold releasing agent may comprise 10 to 50% by weight or 20 to 40% by weight of the compound represented by the above Formula 1 and 50 to 90% by weight or 60 to 80% by weight of the compound represented by the above Formula 2 based on the total weight of the phosphorus-based mold releasing agent. If the molar ratio and the content of the phosphorus-based mold releasing agent are within the above ranges, a lens can be easily released from a mold, and it may have excellent appearance characteristics.

In addition, the phosphorus-based mold releasing agent may further comprise an alcohol. The alcohol may be a compound represented by the following Formula 6:

  [Formula 6]

In the above Formula, $R_6$ is $C_{6-30}$ aryl, $C_{7-30}$ aralkyl, $C_{7-30}$ alkylaryl, or $C_{8-30}$ alkylaralkyl. In such event, at least one of the hydrogens in the unsubstituted functional groups of $C_{6-30}$ aryl, $C_{7-30}$ aralkyl, $C_{7-30}$ alkylaryl, and $C_{6-30}$ alkylaralkyl may be unsubstituted or substituted with a functional group of $C_{1-30}$ alkyl, $C_{6-30}$ aryl, $C_{7-30}$ aralkyl, $C_{7-30}$ alkylaryl, or $C_{8-30}$ alkylaralkyl.

The phosphorus-based mold releasing agent as described above may be prepared by the following process. Specifically, an embodiment provides a process for preparing a phosphorus-based mold releasing agent, which comprises reacting a compound represented by the following Formula 3 with water, an alcohol, or a mixture thereof to prepare a compound represented by the following Formula 1, a compound represented by the following Formula 2, or a mixture thereof:

[Formula 1]
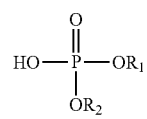

[Formula 2]
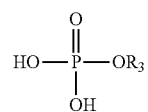

[Formula 3]
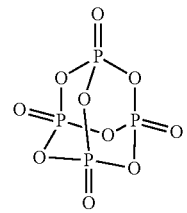

In the above Formulae, $R_1$ to $R_3$ are each independently $C_{1-30}$ alkyl, $C_{6-30}$ aryl, $C_{7-30}$ aralkyl, $C_{7-30}$ alkylaryl, or $C_{8-30}$ alkylaralkyl. Specific examples of the substituents are as exemplified above.

The phosphorus-based mold releasing agent, which comprises the compounds represented by the above Formula 1 and/or Formula 2, may be prepared by reacting 3 to 10 moles, 3 to 7 moles, or 5 to 7 moles of water, an alcohol, or a mixture thereof with 1 mole of the compound represented by the above Formula.

In such event, the alcohol may be a monoalcohol. For example, the alcohol may be octanol, butoxyethanol, dodecanol, 2-ethylhexanol, isotridecyl alcohol, oleyl alcohol, tetracosyl alcohol, tri(propylene glycol)n-butyl ether (wherein n is an integer of 1 to 10), triethylene glycol monomethyl ether, or a mixture thereof.

The alcohol may have a water content of 1,500 ppm or less, 1,300 ppm or less, 1,200 ppm or less, 1,000 ppm or less, 800 ppm or less, 600 ppm or less, 50 to 1,500 ppm, 50 to 1,300 ppm, 50 to 1,200 ppm, 50 to 1,000 ppm, 100 to 1,500 ppm, 100 to 1,300 ppm, 100 to 1,200 ppm, 100 to 1,000 ppm, 100 to 800 ppm, 100 to 600 ppm, 200 to 1,500 ppm, 200 to 1,300 ppm, 200 to 1,200 ppm, or 200 to 1,000 ppm. If the water content is within the above range, a desired phosphorus-based mold releasing agent of the above Formula 1 and/or Formula 2 can be obtained without generation of any byproducts.

According to the above preparation process, the phosphorus-based mold releasing agent may be prepared by first reacting the compound represented by the above Formula 3 with water, followed by reaction with water, an alcohol, or a mixture thereof.

According to an embodiment, the phosphorus-based mold releasing agent may be prepared by reacting 1 mole of the compound represented by the above Formula 3 with 0.5 to 2.5 moles, 0.5 to 2 moles, 0.7 to 2 moles, or 0.7 to 1.5 moles of water to obtain a reactant, which is then reacted with 3 to 8 moles or 3 to 7 moles of water, an alcohol, or a mixture thereof based on 1 mole of the compound represented by the above Formula 3.

According to an embodiment, the phosphorus-based mold releasing agent may be prepared by reacting 1 mole of the compound represented by the above Formula 3 with 0.5 to 2.5 moles, 0.5 to 2 moles, 0.7 to 2 moles, or 0.7 to 1.5 moles of water to obtain a reactant, which is then reacted with 3 to 8 moles, 3 to 7 moles, 3 to 6.5 moles, or 3 to 6 moles of an alcohol based on 1 mole of the compound represented by the above Formula 3.

In addition, according to the above preparation process, the phosphorus-based mold releasing agent may be prepared by reacting the compound represented by the above Formula 3 with an alcohol alone.

The reaction may be carried out at room temperature for 2 to 10 hours. Specifically, it may be carried out at a temperature of 15 to 50° C., 15 to 45° C., 15 to 40° C., or 15 to 35° C. for 2 to 5 hours. If the reaction is carried out within the above temperature range, an unreacted alcohol can be reduced.

The compound represented by the above Formula 3, i.e. phosphorus pentoxide, may be reacted with water, an alcohol, or a mixture thereof at room temperature. In such event, the compound represented by the above Formula 3 may be divided and fed in a plurality of times during the reaction with water, an alcohol, or a mixture thereof. If the compound represented by the above Formula 3 is excessively fed, excessive heat may be generated by the reaction with water, an alcohol, or a mixture thereof, whereby the temperature may fall outside the temperature range. Thus, the compound represented by the above Formula 3 may be divided and fed in a plurality of times, rather than entirely fed at once.

Specifically, 1 mole of the compound represented by the above Formula 3 may be divided and fed in 1 to 8 times, 1 to 5 times, or 2 to 6 times.

According to the above preparation process, the phosphorus-based mold releasing agent may comprise a small amount of other phosphorus-based compounds than the phosphorus-based compounds represented by the above Formulae 1 and 2. Specifically, the resultant obtained upon completion of the reaction of phosphorus pentoxide with water and/or an alcohol, i.e., the phosphorus-based mold releasing agent may comprise 10% by weight or less, 5% by weight or less, 0.01 to 10% by weight, or 0.01 to 5% by weight of a compound represented by the following Formula 4 based on the total weight of the phosphorus-based mold releasing agent.

[Formula 4]

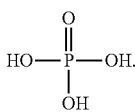

Further, according to the above preparation process, the phosphorus-based mold releasing agent may comprise 10% by weight or less, 9.5% by weight or less, 0.01 to 10% by weight, or 0.01 to 9.5% by weight of an unreacted alcohol upon the reaction based on the total weight of the alcohol before the reaction.

Thiol Compound

The thiol compound may be at least one selected from the group consisting of 4-mercaptomethyl-3,6-dithia-1,8-octanedithiol, 4-mercaptomethyl-1,8-dimercapto-3,6-dithiaoctane, 1,9-dimercapto-3,7-dithianone, 1,13-dimercapto-3,7,11-trithiatridecane, glycol di(3-mercaptopropionate), 1,4-dithiane-2,5-diyl methanethiol, 2-mercaptomethyl-1,5-dimercapto-3-thiapentane, trimethylolpropane tri(3-mercaptopropionate), 4,8-di(mercaptoethyl)-1,11-dimercapto-3,6,9-trithiadecane, 5,9-di(mercaptoethyl)-1,12-dimercapto-3,7,10-trithiadodecane, pentaerythritol tetra(3-mercaptopropionate), and pentaerythritol tetra(mercaptoacetate).

Isocyanate Compound

The isocyanate compound may be at least one selected from the group consisting of m-xylene diisocyanate, toluene diisocyanate, bis(isocyanatomethyl cyclohexane), and isophorone diisocyanate.

The polymerizable composition that comprises the thiol compound and the isocyanate compound may have an (NCO)(OH+SH) equivalent ratio (i.e., molar ratio of the functional groups) of 0.8 to 1.2, 0.9 to 1.1, or 1 to 1.1. Within the above range, the dimensional stability of the cured product can be ensured, the reaction rate can be controlled, whereby appearance defects can be suppressed, and the curing density can be maintained to be appropriate, whereby the heat resistance and strength can be enhanced.

Additive

The polymerizable composition may further comprise such additives as an internal mold release agent, a reaction catalyst, a heat stabilizer, an ultraviolet absorber, and a blueing agent, depending on the purpose thereof.

Examples of the internal mold release agent include a fluorine-based nonionic surfactant having a perfluoroalkyl group, a hydroxyalkyl group, or a phosphate ester group; a silicone-based nonionic surfactant having a dimethylpolysiloxane group, a hydroxyalkyl group, or a phosphate ester group; an alkyl quaternary ammonium salt such as trimethylcetylammonium salt, trimethylstearylammonium salt, dimethylethylcetylammonium salt, triethyldodecylammonium salt, trioctylmethylammonium salt, and diethylcyclohexadodecylarrmmoniur salt; and an acidic phosphate ester. It may be used alone or in combination of two or more.

As the reaction catalyst, a known reaction catalyst used in the production of a polythiourethane resin may be appropriately used. For example, it may be selected from the group consisting of a dialkyltin halide such as dibutyltin dichloride and dimethyltin dichloride; a dialkyltin dicarboxylate such as dimethyltin diacetate, dibutyltin dioctanoate, and dibutyltin dilaurate; a dialkyltin dialkoxide such as dibutyltin dibutoxide and dioctyltin dibutoxide; a dialkyltin dithioalkoxide such as dibutyltin di(thiobutoxide); a dialkyltin oxide such as di(2-ethylhexyl)tin oxide, dioctyltin oxide, and bis(butoxy dibutyltin) oxide; and a dialkyltin sulfide such as dibutyltin sulfide. Specifically, it may be selected from the group consisting of a dialkyltin halide such as dibutyltin dichloride, dimethyltin dichloride, and the like.

As the heat stabilizer, a metal fatty acid salt, a phosphorus compound, a lead compound, or an organotin compound may be used alone or in combination of two or more.

As the ultraviolet absorber, benzophenone-based, benzotriazole-based, salicylate-based, cyanoacrylate-based, oxanilide-based, or the like may be used.

The blueing agent has an absorption band in the wavelength range from orange to yellow in the visible light region and has a function of adjusting the color of an optical material made of a resin. Specifically, the blueing agent may comprise a material that exhibits blue to violet color, but is not particularly limited thereto. In addition, examples of the blueing agent include a dye, a fluorescent whitening agent, a fluorescent pigment, and an inorganic pigment. It may be properly selected in accordance with the properties required for an optical component to be produced and the resin color. The blueing agent may be used alone or in combination of two or more thereof. In view of the solubility in the polymerizable composition and the transparency of the optical material to be produced, a dye is preferably used as the blueing agent. From the viewpoint of the absorption wavelength, the dye may particularly have a maximum absorption wavelength of 520 to 600 nm; and more particularly, a maximum absorption wavelength of 540 to 580 nm. In addition, in terms of the structure of the compound, an anthraquinone-based dye is preferable as the dye. The method of adding the blueing agent is not particularly limited, and the blueing agent may be added to the monomers in advance. Specifically, various methods can be used; for example, the blueing agent may be dissolved in the monomers or may be contained in a master solution in a high concentration, the master solution being later diluted with the monomers or other additives and then added.

Plastic Lens

An embodiment provides a polythiourethane-based plastic lens produced by using the phosphorus-based mold releasing agent obtained by the above preparation process. If required, the polythiourethane-based plastic lens may be subjected to physical or chemical treatment such as surface polishing, antistatic treatment, hard coat treatment, anti-reflection coat treatment, dyeing treatment, and dimming treatment for the purpose of imparting thereto anti-reflection, hardness, abrasion resistance, chemical resistance, anti-fogging, or fashionity.

When the polythiourethane-based plastic lens is released in the mold-release step, the lens can already be naturally released from the mold when it is cooled to room temperature, thereby facilitating the mold release. In addition, the appearance of the lens does not show any defects such as cloudiness on the surface even after the mold release, and bubbles are not present in the lens. Thus, the lens may have excellent appearance characteristics (Evaluation Examples (1) to (4)).

As described above, die phosphorus-based mold releasing agents according to the embodiments can be prepared more easily and conveniently by using phosphorous pentoxide, which can easily react with a monoalcohol and/or water at room temperature and in the absence of a catalyst or a solvent. In addition, byproducts are not generated during the reaction. Thus, when a lens is produced by using the mold release agent obtained therefrom, it is possible to prevent a defective appearance of the lens that may be caused by byproducts, thereby further enhancing the appearance properties thereof. Further, since separate steps for removing byproducts, specifically, such steps as washing and filtration, are not required, wastewater is not generated. Thus, it is not only environmentally friendly, but the production cost can also be reduced as the process is simple.

Hereinafter, the present invention is explained in detail by Examples. The following Examples are intended to further illustrate the present invention, and the scope of the Examples is not limited thereto.

EXAMPLE

Preparation of a Phosphorus-Based Mold Releasing Agent

Example 1

A 2-L, 3-neck reactor equipped with a mechanical stirrer, a thermometer, and a condenser tube was placed in a glove box filled with dry nitrogen. 18 parts by weight (1 mole) of distilled water was added thereto while agitation was carried out at a speed of 200 rpm. Then, 283.9 parts by weight (1 mole) of phosphorus pentoxide was divided into 5 portions and slowly added to the reactor. Thereafter, 651 parts by weight (5 moles) of 1-octanol having a water content of 200 ppm was added thereto, followed by reaction for 4 hours while the reaction temperature was maintained at 40° C. or lower, thereby preparing dioctyl hydrogen phosphate (the compound represented by Formula 1) and octyl dihydrogen phosphate (the compound represented by Formula 2).

As a result of an analysis of the components by 1H-NMR in an integral ratio, the compounds of the above Formulae 1 and 2 were obtained in a ratio of 1:2, except for 6.3% of the unreacted alcohol, when the total weight of the obtained phosphate ester mixture was 100%.

Example 2

The same procedures as Example 1 were carried out to obtain a phosphate ester mixture comprising dioctyl hydrogen phosphate (the compound represented by Formula 1) and octyl dihydrogen phosphate (the compound represented by Formula 2), except that only phosphorus pentoxide was added to the reactor without adding distilled water and that 1-octanol having a water content of 200 ppm was then added in an amount of 781.2 parts by weight (6 moles) instead of 651 parts by weight (5 moles).

As a result of an analysis of the components by 1H-NMR in an integral ratio, the compounds of the above Formulae 1 and 2 were obtained in a ratio of 1:1, except for 5.1% of the unreacted alcohol, when the total weight of the obtained phosphate ester mixture was 100%.

Example 3

The same procedures as Example 1 were carried out to obtain a phosphate ester mixture comprising bis(2-butoxyethyl) hydrogen phosphate (the compound represented by Formula 1) and 2-butoxyethyl hydrogen phosphate (the compound represented by Formula 2), except that 591 parts by weight (5 moles) of 2-butoxyethanol having a water content of 700) ppm was added to the reactor instead of 651 parts by weight (5 moles) of 1-octanol having a water content of 200 ppm.

As a result of an analysis of the components by 1H-NMR in an integral ratio, the compounds of the above Formulae 1 and 2 were obtained in a ratio of 1:2, except for 9.4% of the unreacted alcohol, when the total weight of the obtained phosphate ester mixture was 100%.

Example 4

The same procedures as Example 1 were carried out to obtain a phosphate ester mixture comprising dodecyl hydrogen phosphate (the compound represented by Formula 1) and dodecyl dihydrogen phosphate (the compound represented by Formula 2), except that only phosphorus pentoxide was added to the reactor without adding distilled water and that 745.2 parts by weight (3 moles) of tri(propylene glycol)-butyl ether having a water content of 300 ppm and 558.9 parts by weight (3 moles) of 1-dodecanol having a water content of 100 ppm were added instead of 651 parts (5 moles) of 1-octanol having a water content of 200 ppm.

As a result of an analysis of the components by 1H-NMR in an integral ratio, the compounds of the above Formulae 1 and 2 were obtained in a ratio of 1:1, except for 7.1% of the unreacted alcohols, when the total weight of the obtained phosphate ester mixture was 100%.

Example 5

The same procedures as Example 1 were carried out to obtain a phosphate ester mixture comprising bis(2-(2-(2-methoxyethoxy)ethoxy)ethyl) hydrogen phosphate (the compound represented by Formula 1) and bis(2-(2-(2-methoxyethoxy)ethoxy)ethyl) dihydrogen phosphate (the compound represented by Formula 2), except that 821 parts by weight (5 moles) of triethylene glycol monomethyl ether having a water content of 1,200 ppm was added to the reactor instead of 651 parts by weight (5 moles) of i-octanol having a water content of 200 ppm.

As a result of an analysis of the components by 1H-NMR in an integral ratio, the compounds of the above Formulae 1 and 2 were obtained in a ratio of 1:2, except for 131% of the unreacted alcohol, when the total weight of the obtained phosphate ester mixture was 100%.

Comparative Example 1

The same procedures as Example 1 were carried out to obtain a phosphate ester mixture comprising 2-butoxyethyl dihydrogen phosphate (the compound represented by Formula 2), except that 354.6 parts by weight (3 moles) of 2-butoxyethanol having a water content of 700 ppm and 54 parts by weight (3 moles) of distilled water were added to the reactor instead of 651 parts by weight (5 moles) of 1-octanol having a water content of 200 ppm and 18 parts by weight (1 mole) of distilled water.

As a result of an analysis of the components by 1H-NMR in an integral ratio, the compound of the above Formula 2 was obtained (84.4%), except for 15.6% of the unreacted alcohol, when the total weight of the obtained phosphate ester mixture was 100%.

Preparation of a Polymerizable Composition 204.2 parts by weight of m-xylene diisocyanate, 188 parts by weight of 4-mercaptomethyl-3,6-dithia-1,8-octanedithiol, 0.1 part by weight of dibutyltin dichloride as a catalyst, 2-(2-hydroxy-5-tert-butylphenyl)benzotriazole as an ultraviolet stabilizer, and one of the phosphate ester-based mold release agents prepared in Examples 1 to 4 and Comparative Example 1 were mixed. In such event, the phosphorus-based mold releasing agent was added in an amount of 20 ppm, 100 ppm, 500 ppm, 1,000 ppm, or 2,000 ppm as shown in Table 1 below. The mixture was degassed at a temperature of 20° C. and a pressure of 2 torrs for 1 hour and then filtered through a Teflon filter of 3 μm.

Preparation of a Plastic Lens

The polymerizable composition was injected into a glass mold (cavity; 4 curves in all uneven surfaces, center thickness: 2 mm) assembled with a tape. The mold was heated from 20° C. to 120° C. at a rate of 5° C./min, and polymerization was carried out at 120° C. for 18 hours. Thereafter, the cured resin in the glass mold was further cured at 130° C. for 4 hours, and the molded article (or a plastic lens) was then released from the glass mold.

Evaluation Example

The lenses produced using the phosphorus-based mold releasing agents of Examples 1 to 4 and Comparative Example 1 were evaluated according to the following methods. The results are shown in Table 1 below.

(1) Striae

The surface of the lenses produced using the phosphorus-based mold releasing agents of Examples 1 to 4 and Comparative Example 1 was observed by the naked eyes and evaluated according to the following criteria.

x: Non-uniform phenomena such as wavy patterns appear on the surface of the lens Δ: The center of the lens is clean, but the edges are non-uniform ⊚: Non-uniform phenomena do not appear on the entire lens surface (2) Cloudiness The lenses produced using the phosphorus-based mold releasing agents of Examples 1 to 4 and Comparative Example 1 were each irradiated with light having a power of 300 W using a halogen lamp, observed by the naked eyes, and evaluated according to the following criteria.

⊚: good (no turbidity)

Δ: slightly poor (a slight amount of turbidity)

x: poor (noticeable turbidity)

(3) Generation of Bubbles

The lenses produced using the phosphorus-based mold releasing agents of Examples 1 to 4 and Comparative Example 1 were each observed with a microscope at a magnification of 100 times to check whether bubbles were generated in the lenses and evaluated according to the following criteria.

S: the number of bubbles is 0

A: the number of bubbles is 1 to 10

B: the number of bubbles is 11 to 30

C: the number of bubbles is 31 or more (4) Evaluation of Mold Releasability

The mold releasability when the lens was released from the mold of the glass mold at room temperature at the time of producing the plastic lens was evaluated according to the following criteria.

⊚ (excellent): At the time of cooling to room temperature, the entire contact surface of the molded article is naturally released from the mold ○ (good): At the time of cooling to room temperature, the contact surface of the molded article is partially released from the mold, and it is easily released by a mold release operation (i.e., a wedge-shaped mold release jig is inserted between the mold and the contact surface of the molded article to have the molded article released from the mold)

Δ (slightly poor): Even if the mold is cooled to room temperature, the mold and the molded article are in close contact with each other, and the mold is finally released by a mold release operation. The lens or the mold is sometimes damaged x (poor): Even if the mold is cooled to room temperature and a mold release operation is performed, the mold and the molded article are in close contact with each other, or they are damaged by the mold release operation

TABLE 1

| Evaluation example | | Content of a phosphorus-based mold releasing agent | | | | |
|---|---|---|---|---|---|---|
| | | 20 ppm | 100 ppm | 500 ppm | 1,000 ppm | 2,000 ppm |
| Example 1 | Stria | Δ | Δ | ◎ | ◎ | ◎ |
| | Cloudiness | ◎ | ◎ | ◎ | ◎ | ◎ |
| | Bubble | A | A | S | S | S |
| | Releasability | Δ | Δ | ○ | ○ | ◎ |
| Example 2 | Stria | Δ | ◎ | ◎ | ◎ | ◎ |
| | Cloudiness | ◎ | ◎ | ◎ | ◎ | ◎ |
| | Bubble | A | S | S | S | S |
| | Releasability | Δ | Δ | Δ | ○ | ◎ |
| Example 3 | Stria | Δ | ◎ | ◎ | ◎ | ◎ |
| | Cloudiness | ◎ | ◎ | ◎ | ◎ | ◎ |
| | Bubble | A | S | S | S | S |
| | Releasability | Δ | Δ | ○ | ◎ | ◎ |
| Example 4 | Stria | Δ | Δ | Δ | ◎ | ◎ |
| | Cloudiness | Δ | Δ | ◎ | ◎ | ◎ |
| | Bubble | A | A | A | S | S |
| | Releasability | Δ | ○ | ○ | ◎ | ◎ |
| Example 5 | Stria | Δ | Δ | Δ | ◎ | ◎ |
| | Cloudiness | Δ | Δ | X | X | X |
| | Bubble | A | B | C | C | C |
| | Releasability | X | X | Δ | Δ | ○ |
| Comparative Example 1 | Stria | ◎ | ◎ | ◎ | ◎ | ◎ |
| | Cloudiness | Δ | Δ | Δ | X | X |
| | Bubble | A | S | S | S | S |
| | Releasability | X | X | Δ | Δ | ○ |

As shown in Table 1, the lenses produced using the phosphorus-based mold releasing agents prepared in Examples 1 to 4 were naturally released from the mold upon cooling to room temperature. The surface of the released lenses was clear and transparent, and no bubbles were present in the lenses. In contrast, in most cases of producing a lens using the phosphorus-based mold releasing agent (Comparative Example 1), which comprised only the compound represented by Formula 2 without the compound represented by Formula 1, the lens was not released from the mold even if it was cooled to room temperature, or the mold releasability was poor. Further, when a physical force was applied by performing a mold release operation, the lens was damaged, or even if it was released by the mold release operation, the appearance of the lens was poor or the lens was partially damaged. In addition, the released lens was not uniform since it had wave patterns on its surface, or it was not transparent since it was turbid. Since it had a large number of bubbles therein, the lens was also poor in terms of cloudiness and bubble generation.

The invention claimed is:

1. A process for preparing a phosphorus-based mold releasing agent, which comprises reacting a compound represented by the following Formula 3 with water, an alcohol, or a mixture thereof to prepare a mixture of a compound represented by the following Formula 1 and a compound represented by the following Formula 2:

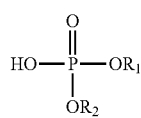

[Formula 1]

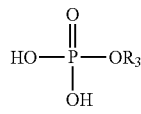

[Formula 2]

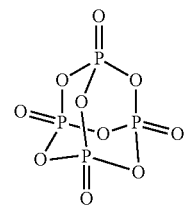

[Formula 3]

wherein in the above Formulae, $R_1$ to $R_3$ are each independently $C_{1-30}$ alkyl, $C_{6-30}$ aryl, $C_{7-30}$ aralkyl, $C_{7-30}$ alkylaryl, or $C_{8-30}$ alkylaralkyl, and wherein at least one of $R_1$ to $R_3$ is a group represented by the following Formula 5:

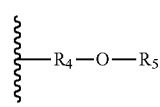

[Formula 5]

wherein, in the above Formula, $R_4$ is $C_{6-30}$ arylene, $C_{7-30}$ aralkylene, $C_{7-30}$ alkylarylene, or $C_{8-30}$ alkylaralkylene, and $R_5$ is $C_{6-30}$ aryl, $C_{7-30}$ aralkyl, $C_{7-30}$ alkylaryl, or $C_{8-30}$ alkylaralkyl.

2. The process for preparing a phosphorus-based mold releasing agent of claim 1, wherein 0.5 to 7 moles of water, the alcohol, or the mixture thereof is reacted with 1 mole of the compound represented by the above Formula 3.

3. The process for preparing a phosphorus-based mold releasing agent of claim 1, wherein the compound represented by the above Formula 3 is first reacted with water, followed by reaction with water, the alcohol, or the mixture thereof.

4. The process for preparing a phosphorus-based mold releasing agent of claim 1, wherein the compound represented by the above Formula 3 is reacted with the alcohol alone.

5. The process for preparing a phosphorus-based mold releasing agent of claim 1, wherein the compound represented by the above Formula 3 is divided and fed in a plurality of times during the reaction with water, the alcohol, or the mixture thereof.

6. The process for preparing a phosphorus-based mold releasing agent of claim 1, wherein the phosphorus-based mold releasing agent comprises 10% by weight or less of a compound represented by the following Formula 4 based on the total weight of the phosphorus-based mold releasing agent:

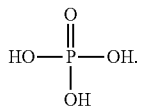

[Formula 4]

7. The process for preparing a phosphorus-based mold releasing agent of claim 1, wherein the alcohol is octanol, butoxyethanol, dodecanol, 2-ethylhexanol, isotridecyl alcohol, oleyl alcohol, tetracosyl alcohol, tri(propylene glycol) n-butyl ether (wherein n is an integer of 1 to 10), triethylene glycol monomethyl ether, or a mixture thereof.

8. The process for preparing a phosphorus-based mold releasing agent of claim 1, wherein the alcohol has a water content of 1,500 ppm or less.

9. The process for preparing a phosphorus-based mold releasing agent of claim 1, wherein the phosphorus-based mold releasing agent comprises 10% by weight or less of an unreacted alcohol upon the reaction based on the total weight of the alcohol before the reaction.

10. A polymerizable composition for an optical use, which comprises a thiol compound;
an isocyanate compound; and
a phosphorus-based mold releasing agent,
wherein the phosphorus-based mold releasing agent comprises a first phosphorus-based compound having one hydroxyl group and a second phosphorus-based compound having two hydroxy groups,
the first phosphorus-based compound is a compound represented by the following Formula 1, and the second phosphorus-based compound is a compound represented by the following Formula 2:

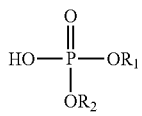

[Formula 1]

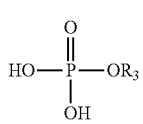

[Formula 2]

wherein in the above Formulae, $R_1$ to $R_3$ are each independently $C_{1-30}$ alkyl, $C_{6-30}$ aryl, $C_{7-30}$ aralkyl, $C_{7-30}$ alkylaryl, or $C_{8-30}$ alkylaralkyl, and at least one of $R_1$ to $R_3$ is a compound represented by the following Formula 5:

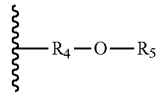

[Formula 5]

and wherein in the above Formulae, $R_4$ is $C_{6-30}$ arylene, $C_{7-30}$ aralkylene, $C_{7-30}$ alkylarylene, or $C_{8-30}$ alkylaralkylene, and
$R_5$ is $C_{6-30}$ aryl, $C_{7-30}$ aralkyl, $C_{7-30}$ alkylaryl, or $C_{8-30}$ alkylaralkyl.

11. The polymerizable composition for an optical use of claim 10, wherein $R_1$ to $R_3$ are each independently selected from the group consisting of an octyl group, a butoxyethyl group, a 2-butoxyethyl group, a butoxy group, a 1-butoxy group, a dodecyl group, a tri(propylene glycol)n butylethyl group (wherein n is an integer of 1 to 10), a 2-(2-(2-methoxyethoxy)ethoxy)ethyl group, a methyl group, an ethyl group, a 1-propyl group, an isopropyl group, a 1-butyl group, a 2-butyl group, an isobutyl group, a tert-butyl group, a 1-pentyl group, an isopentyl group, a 2-pentyl group, a 3-pentyl group, a 2-methyl-1-butyl group, a 3-methyl-2-butyl group, a tert-pentyl group, a 1-hexyl group, a 2-methyl-1-pentyl group, a 4-methyl-2-pentyl group, a 2-ethyl-1-butyl group, a cyclopentyl group, a methylcyclopentyl group, a cyclohexyl group, a methylcyclohexyl, a 1-heptyl group, a 2-heptyl group, a 3-heptyl group, a methylcyclopentylmethyl group, an ethylcyclopentyl group, a cyclopentylethyl group, a cyclohexylmethyl group, a phenyl group, a naphthyl group, an anthracenyl group, a phenanthrenyl group, a benzoanthracenyl group, a benzophenanthrenyl group, a naphthacenyl group, a pyrenyl group, a dibenzoanthracenyl group, a pentacenyl group, a picenyl group, a benzopyranyl group, a tolyl group (a methylphenyl group), a dimethylphenyl group, a trimethylphenyl group, an ethylphenyl group, a propylphenyl group, a butylphenyl group, a pentylphenyl group, a cyclohexylphenyl group, a trimethylphenyl group, a methylnaphthyl group, a methylphenanthryl group, an ethylphenanthryl group, a propylphenanthryl group, a benzyl group, a phenethyl group, a 1-phenylpropyl group, a naphthylmethyl group, a naphthylethyl group, a methylbenzyl group, a dimethylbenzyl group, a trimethylbenzyl group, a butylbenzyl group, and a dibutylbenzyl group.

12. The polymerizable composition for an optical use of claim 10, wherein the compound represented by the above Formula 1 is dioctyl hydrogen phosphate, bis(2-butoxyethyl) hydrogen phosphate, 1-(1-(1-butoxypropan-2-yloxy)propan-2-yloxy)propan-2-yl dodecyl hydrogen phosphate, bis(2-(2-(2-methoxyethoxy)ethoxy)ethyl) hydrogen phosphate, di(1-methoxy-2-propyl) phosphate, di(1-ethoxy-2-propyl) phosphate, di(1-buthoxy-2-propyl) phosphate, di(2-buthoxy-3-butyl) phosphate, di(1-decyloxy-2-propyl) phosphate, di(1-cyclohexyloxy-2-propyl) phosphate, di(1-aryloxy-2-propyl) phosphate, di(1-(3,7,11,15-tetramethyl-2-hexadecyloxy)-2-propyl) phosphate, di(1-phenoxy-2-propyl) phosphate, di(1-o-methylphenoxy-2-propyl) phosphate, di(1-p-nonylphenoxy-2-propyl) phosphate, di(1-(p-chlorophenoxy-2-propyl) phosphate, di(1-(p-methoxyphenoxy-2-propyl) phosphate, di(1-benzyloxy-2-propyl) phosphate, di(1-(undecyloxy benzyloxy)-2-propyl) phosphate, di(1-(1-buthoxy-2-propoxy)-2-propyl) phosphate, di(tri(1,2-propylene glycol monobutyl ether)) phosphate, di(tetra(1,2-propylene glycol monobutyl ether)) phosphate, or di(penta(1,2-propylene glycol monobutyl ether, and the compound represented by the above Formula 2 is octyl dihydrogen phosphate, 2-butoxyethyl dihydrogen phosphate, dodecyl dihydrogen phosphate, 2-(2-(2-methoxyethoxy)ethoxy)ethyl dihydrogen phosphate, mono(1-methoxy-2-propyl) phosphate, mono(1-ethoxy-2-propyl) phosphate, mono(1-buthoxy-2-propyl) phosphate, mono(2-buthoxy-3-butyl) phosphate, mono(1-decyloxy-2-propyl) phosphate, mono(1-cyclohexyloxy-2-propyl) phosphate, mono(1-arlyoxy-2-propyl) phosphate, mono(1-(3,7,11,15-tetramethyl-2-hexadecyloxy)-2-propyl) phosphate, mono(1-phenoxy-2-propyl) phosphate, mono(1-o-methylphenoxy-2-propyl) phosphate, mono(1-p-nonylphenoxy-2-propyl) phosphate, mono(1-(p-chlorophenoxy-2-propyl) phosphate, mono(1-(p-methoxyphenoxy-2-propyl) phosphate, mono(1-benzyloxy-2-propyl) phosphate, mono (1-(undecyloxy benzyloxy)-2-propyl) phosphate, mono (1-(1-buthoxy-2-propoxy)-2-propyl) phosphate, mono (tri(1,2-propylene glycol monobutyl ether)) phosphate, mono(tetra(1,2-propylene glycol monobutyl ether)) phosphate, or mono(penta(1,2-propylene glycol monobutyl ether)) phosphate.

13. The polymerizable composition for an optical use of claim 10, wherein the phosphorus-based mold releasing agent comprises the compound represented by the above Formula 1 and the compound represented by the above Formula 2 in a molar ratio of 0.5:1 to 1:1.

14. The polymerizable composition for an optical use of claim 10, wherein the phosphorus-based mold releasing agent comprises 10 to 50% by weight of the compound represented by the above Formula 1 and 50 to 90% by weight of the compound represented by the above Formula 2 based on the total weight of the phosphorus-based mold releasing agent.

15. The polymerizable composition for an optical use of claim 10, wherein the phosphorus-based mold releasing agent further comprises an alcohol.

16. The polymerizable composition for an optical use of claim 15, wherein the alcohol is a compound represented by the following Formula 6:

$$R_6-OH \quad \text{Formula 6}$$

and wherein in the above Formulae, $R_6$ is $C_{6-30}$ aryl, $C_{7-30}$ aralkyl, $C_{7-30}$ alkylaryl, or $C_{8-30}$ alkylaralkyl.

17. The polymerizable composition for an optical use of claim 10, which has an (NCO)/(OH+SH) equivalent ratio of 0.8 to 1.2.

18. The polymerizable composition for an optical use of claim 10, wherein the isocyanate compound is at least one selected from the group consisting of m-xylene diisocyanate, toluene diisocyanate, bis(isocyanatomethyl cyclohexane), and isophorone diisocyanate.

19. The polymerizable composition for an optical use of claim 10, wherein the thiol compound is at least one selected from the group consisting of 4-mercaptomethyl-3,6-dithia-1,8-octanedithiol, 4-mercaptomethyl-1,8-dimercapto-3,6-dithiaoctane, 1,9-dimercapto-3,7-dithianone, 1,13-dimercapto-3,7,11-trithiatridecane, glycol di(3-mercaptopropionate), 1,4-dithiane-2,5-diyl methanethiol, 2-mercaptomethyl-1,5-dimercapto-3-thiapentane, trimethylolpropane tri(3-mercaptopropionate), 4,8-di(mercaptomethyl)-1,11-dimercapto-3,6,9-trithiandecane, 5,9-di(mercaptoethyl)-1,12-dimercapto-3,7,10-trithiadodecane, pentaerythritol tetra(3-mercaptopropionate), and pentaerythritol tetra(mercaptoacetate).

20. A phosphorus-based mold releasing agent, which comprises a first phosphorus-based compound having one hydroxyl group and a second phosphorus-based compound having two hydroxy groups, wherein the first phosphorus-based compound is a compound represented by the following Formula 1, the second phosphorus-based compound is a compound represented by the following Formula 2, and the molar ratio of the first phosphorus-based compound to the second phosphorus-based compound is 0.5:1 to 1:1:

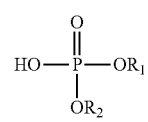

[Formula 1]

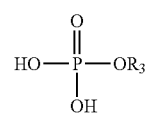

[Formula 2]

wherein in the above Formulae, $R_1$ to $R_3$ are each independently $C_{1-30}$ alkyl, $C_{6-30}$ aryl, $C_{7-30}$ aralkyl, $C_{7-30}$ alkylaryl, or $C_{8-30}$ alkylaralkyl, and wherein at least one of $R_1$ to $R_3$ is a group represented by the following Formula 5:

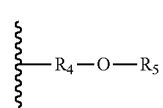

[Formula 5]

wherein, in the above Formula, $R_4$ is $C_{6-30}$ arylene, $C_{7-30}$ aralkylene, $C_{7-30}$ alkylarylene, or $C_{8-30}$ alkylaralkylene, and $R_5$ is $C_{6-30}$ aryl, $C_{7-30}$ aralkyl, $C_{7-30}$ alkylaryl, or $C_{8-30}$ alkylaralkyl.

* * * * *